(12) United States Patent
Gold et al.

(10) Patent No.: US 6,636,941 B1
(45) Date of Patent: Oct. 21, 2003

(54) ENHANCED STABLE DISK STORAGE

(75) Inventors: Israel Gold, Haifa (IL); Julian Satran, Atlit (IL); Dafna Sheinwald, Nofit (IL)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 09/611,062

(22) Filed: Jul. 6, 2000

Related U.S. Application Data

(60) Provisional application No. 60/176,507, filed on Jan. 18, 2000.

(51) Int. Cl.$^7$ .............................................. G06F 12/00
(52) U.S. Cl. ...................... 711/112; 711/111; 711/114; 711/4
(58) Field of Search .................. 711/112, 4, 111, 711/114; 714/5, 15; 707/2, 202

(56) References Cited

U.S. PATENT DOCUMENTS

| | | | | |
|---|---|---|---|---|
| 5,239,621 A | * | 8/1993 | Brown et al. | 358/1.16 |
| 5,280,611 A | * | 1/1994 | Mohan et al. | 707/8 |
| 5,345,575 A | | 9/1994 | English et al. | 711/112 |
| 5,481,694 A | | 1/1996 | Chao et al. | 711/112 |
| 5,708,793 A | | 1/1998 | Franaszek et al. | 711/112 |
| 5,778,395 A | * | 7/1998 | Whiting et al. | 707/204 |
| 5,864,849 A | * | 1/1999 | Bohannon et al. | 707/8 |
| 5,890,188 A | * | 3/1999 | Okamoto et al. | 711/5 |
| 5,991,804 A | * | 11/1999 | Bolosky et al. | 709/221 |
| 6,038,636 A | * | 3/2000 | Brown et al. | 711/103 |
| 6,049,802 A | * | 4/2000 | Waggener et al. | 707/100 |
| 6,330,640 B1 | * | 12/2001 | Williams et al. | 711/112 |
| 6,353,834 B1 | * | 3/2002 | Wong et al. | 707/202 |
| 6,415,328 B1 | * | 7/2002 | Korst | 709/232 |

OTHER PUBLICATIONS

Denning, "Fault Tolerant Operating Systems," pp 359–389, ACM, 1976.*
Verhofstad, "Recovery Techniques For Database Systems," pp 167–195, ACM, 1978.*
de Jonge et al., "The Logical Disk: A New Approach to Improving File Systems", *Proceedings of the 14th Symposium on Operating Systems Principles*, pp. 15–28, Dec. 1993.
English et al., "Loge: a self–organizing disk controller", *Proceedings of the USENIX Winter 1992 Technical Conference*, pp. 237–251, Jan. 1992.
Chao et al., "Mime: a high performance parrallel storage device with strong recovery guarantess", HPL–CSP–92–9, published by Hewlett–Packard Company, Nov. 1992, pp 1–18.
Lee et al., "Petal: Distributed Virtual Disks", *Proc. 7th Intl. Conf. On Architectural Support for Programming Languages on Operating Systems*, pp. 84–92, Oct. 1996.

* cited by examiner

Primary Examiner—Matthew Kim
Assistant Examiner—Stephen Elmore
(74) Attorney, Agent, or Firm—Darby & Darby (57) ABSTRACT

Apparatus for electronic data storage, including a non-volatile memory, adapted to receive a succession of data blocks for storage at respective locations therein. The apparatus includes a controller which is configured to convey the succession of data blocks to the non-volatile memory, while writing to the non-volatile memory, together with at least some of the data blocks, a pointer value to the location of a subsequent data block in the succession. The apparatus preferably includes services that are usually performed by higher level file systems, such as allocation and deletion of blocks. Furthermore, the apparatus facilitates stable storage operations so that block contents are maintained intact in case of a write failure.

23 Claims, 9 Drawing Sheets

FIG. 9

ENHANCED STABLE DISK STORAGE

CROSS-REFERENCE TO RELATED APPLICATIONS

This application claims the benefit of U.S. Provisional Patent Application No. 60/176,507, filed Jan. 18, 2000, which is incorporated herein by reference.

FIELD OF THE INVENTION

The present invention relates generally to electronic data storage systems, and specifically to nonvolatile storage systems which are able to recover from system failure.

BACKGROUND OF THE INVENTION

Methods for efficiently storing data, and recovering the stored data in the event of a computer system failure, are known in the art. The methods rely on storing information additional to the data to a non-volatile memory, typically a disk, and using the additional information to recover the stored data when the failure occurs.

U.S. Pat. No. 5,345,575 to English et al., whose disclosure is incorporated herein by reference, describes a disk controller comprising a memory. The memory contains a table mapping logical addresses of data blocks stored on a disk to labels identifying physical storage locations. In addition to writing the data to a storage location, the disk controller writes the associated logical address of each storage location, a time stamp, and data indicating where in a sequence of data blocks a specific data block occurs. The additional information is used to recover from system failures by reading from substantially the whole disk.

U.S. Pat. No. 5,481,694 to Chao et al., whose disclosure is incorporated herein by reference, describes an electronic data storage system comprising a memory, a plurality of magnetic disk units, and a controller. The memory comprises a table cross-referencing logical addresses with physical addresses on the disk units, a list of physical addresses containing obsolete data, and a list of physical addresses for segments on the disk units which are able to receive data. When data are written to the disk units, a tag comprising the logical address and a sequence number for multiblock writes is written with the data. To recover from a system failure, a checkpoint log and checkpoint segments stored on the disk units recover the table and lists.

U.S. Pat. No. 5,708,793 to Franaszek et al., whose disclosure is incorporated herein by reference, describes a method for optimizing a disk for a random write workload. The method comprises maintaining a mapping of logical to physical addresses within a disk controller. Data are written to the disk at a free disk location, the location being chosen to minimize time taken to write to the location.

In an article by de Jonge et al., "The Logical Disk: A New Approach to Improving File Systems," in *Proceedings of the 14th Symposium on Operating Systems Principles*, pp. 15–28, December 1993, which is incorporated herein by reference, the authors describe a logical disk wherein an interface is defined to disk storage which separates file management and disk management. The interface uses logical block numbers and block lists, and supports multiple file systems.

In an article by English et al., "Loge: a self-organizing disk controller," in *Proceedings of the USENIX Winter 1992 Technical Conference*, pp. 237–251, January 1992, which is incorporated herein by reference, the authors describe a system for storing data to a disk using a translation table and an allocation map. A trailer tag comprising a block address and a time stamp is written to the disk together with the stored data. The information in the trailer tag enables the system to recover from a failure.

In an article by Chao et al., "Mime: a high performance parallel storage device with strong recovery guarantees," HPL-CSP-92-9, published by Hewlett-Packard Company, November 1992, which is incorporated herein by reference, the authors describe a disk storage architecture similar to that of Loge, as described above. In Mime, the trailer tag comprises a block address, a sequence number for multiblock writes, and a last-packet-in-multiblock-write flag. As in Loge, the trailer tag information enables the system to recover from a failure.

SUMMARY OF THE INVENTION

It is an object of some aspects of the present invention to provide apparatus and methods for improved storage of electronic data in a non-volatile memory.

It is a further object of some aspects of the present invention to provide apparatus and methods for improved recovery of data in the event of a failure in a computing system.

In preferred embodiments of the present invention, an enhanced storage system (ESS) for data storage comprises a non-volatile on-disk storage medium which is written to and read from by a disk arm and a disk head, which are typically industry-standard components. The ESS uses data structures which are maintained in volatile memory, some of which data structures are used to generate incremental system data regarding read and write operations to the storage medium. The data structures comprise, inter alia, a table which translates between logical addresses and disk sector addresses, and an allocation bitmap which shows whether a disk sector address is available to be written to. The translation table is referred to by the ESS before any read, write, allocate, or delete, operation to the disk is performed, and the allocation bitmap is updated before and after each write.

The physical locations for successive writes to the disk are allocated so as to maintain the disk arm moving, insofar as possible, in a preferred direction. Each time user data are written to a given block on the disk, a tag containing incremental system data is also written to the same block. The system data are used subsequently, if needed, to enable the system to recover in case a failure, such as a power failure, occurs before the locations of all of the blocks have been written to the disk in a checkpoint operation, described below. (The locations of the blocks are stored in the translation table.) The incremental system data point forward to the next block to be written to, so that blocks are "chained" together and can be conveniently found and recovered.

Periodically and/or on demand, preferably when the disk arm has to move opposite to the preferred direction, the storage system writes checkpoint data to the disk. The checkpoint data comprise the translation table and the allocation bitmap and data pointing to the beginning of a block chain. Most preferably, the checkpoint data are written to a predetermined region of the disk. Thus the checkpoint data can be used as a starting point when recovering from a failure.

The enhanced storage system of the present invention comprises a rich set of disk operations and thus has a number of advantages over systems known in the art:

By having the majority of write operations to the disk occurring on a preferred direction of motion of the disk arm, disk write time is improved. (If most reads are supplied by cache hits, disk write time is optimized.)

In the event of a volatile memory failure, a complete recovery is possible from checkpoint data and incremental system data that have been stored on the disk.

Since the ESS chains together blocks which are written to the disk, recovery from a failure is linear with the number of block write operations since the last checkpoint. Thus recovery takes substantially the same amount of time as was taken for the write operations performed since the last checkpoint, so that recovery time is optimized.

As a natural extension of the forward chaining of blocks, the ESS supports allocation and write, and deletion of blocks that withstand failures, so avoiding leakage of blocks, unlike other methods known in the art.

No extra input or output disk operations are required at the time of reading to or writing from the disk. All information necessary for a complete recovery from a disk failure is incorporated into blocks comprising user data as the data blocks themselves are written to the disk.

All information for a complete disk recovery is written to the disk, so that the disk may be transferred from one disk host and used in another disk host.

In some preferred embodiments of the present invention, a disk is partitioned so that a first part is operated as a data storage system according to the present invention as described herein, and a second part of the disk is operated as a conventional storage system, without special means for failure recovery.

Although some preferred embodiments are described herein with reference to a single disk, in other referred embodiments of the present invention, a plurality of separate disks are operated by a storage system according to the present invention as described herein.

There is therefore provided, in accordance with a referred embodiment of the present invention, apparatus for electronic data storage, including:

a non-volatile memory, adapted to receive a succession of data blocks for storage at respective locations therein; and a controller, which is configured to convey the succession of data blocks to the non-volatile memory while writing to the non-volatile memory, together with at least some of the data blocks, a pointer value to the location of a subsequent data block in the succession.

Preferably, the apparatus includes a volatile memory which stores one or more data structures containing data indicative of one or more properties of at least some of the data blocks, at least some of which data are written by the controller to the non-volatile memory, so that the contents of the volatile memory can be regenerated from the at least some of the data in the one or more data structures that are stored in the non-volatile memory.

Preferably, one of the data structures includes a translation table which maps logical addresses of the succession of data blocks to respective physical addresses.

Preferably, the controller writes the respective logical addresses to the succession of data blocks.

Further preferably, one of the data structures includes an allocation bitmap which maps an availability of each of the successive locations.

Preferably, one of the data structures includes the pointer value to the location of the subsequent data block in the succession.

Preferably, one of the data structures includes a pointer value to a first location in the succession.

Preferably, the non-volatile memory includes a disk having a disk head, and the controller writes the data blocks to the disk in a series of passes of the disk head over a surface of the disk in a single direction.

Further preferably, each of the series of passes has a checkpoint-number, and one of the data structures includes a value indicative of the checkpoint-number of the current data block in the succession.

Preferably, the controller writes the at least some of the data in the one or more data structures to the non-volatile memory at the conclusion of one or more of the passes of the disk head.

Preferably, the controller writes a type tag indicative of a use of each of the data blocks to each respective data block.

Preferably, the apparatus includes a host server which manages the non-volatile memory is mounted, wherein the host server is able to recover contents of a volatile memory from data written by the controller to the non-volatile memory.

Preferably, the non-volatile memory includes a portion to which the controller does not write the succession of data blocks with the pointer value.

There is further provided, in accordance with a referred embodiment of the present invention, a method for electronic data storage, including:

providing a succession of data blocks for storage at respective locations in a non-volatile memory;

determining for each of at least some of the data blocks in the succession a pointer value to a data block to be written to in a subsequent storage operation; and storing the succession of the data blocks and the pointer values in the non-volatile memory.

Preferably, the method includes storing in a volatile memory one or more data structures containing data indicative of one or more properties of at least some of the data blocks, and writing at least some of the data that are in the data structures to the non-volatile memory, so that the contents of the volatile memory can be regenerated from the at least some of the data in the one or more data structures that are stored in the non-volatile memory.

Preferably, storing the one or more data structures includes storing a translation table which maps logical addresses of the succession of data blocks to respective physical addresses.

Preferably, the method includes using the translation table to locate a specific data block, so as to read data from the specific data block.

Preferably, storing the one or more data structures includes storing an allocation bitmap which maps an availability of each of the successive locations.

Preferably, writing the at least some of the data to the non-volatile memory includes writing data to one of the succession of data blocks using the steps of:

scanning the one or more data structures to determine an available location in the non-volatile memory;

writing the data and at least some contents of the one or more data structures into the available location; and updating the one or more data structures responsive to the determined available location.

Preferably, scanning the one or more data structures includes allocating a logical address to the available location.

Preferably, writing data to one of the succession of data blocks includes writing a list of logical addresses of data blocks that are to be deleted.

Preferably, the method includes performing a checkpoint operation including the steps of:

locking the one or more data structures;

writing the contents of the one or more data structures to a checkpoint location in the non-volatile memory; and altering at least some of the contents of the one or more data structures responsive to writing the contents to the non-volatile memory.

Further preferably, the method includes performing a memory reconstruction operation including the steps of:

reading the contents of the one or more data structures from the non-volatile memory; and updating the one or more data structures in the volatile memory responsive to the contents.

Preferably, performing the memory reconstruction operation includes reading the contents of all of the one or more data structures written to since performing the checkpoint operation, so that there is no leakage of data blocks.

Preferably, performing the memory reconstruction operation includes reading the contents of all of the one or more data structures written to since performing the checkpoint operation in a time substantially equal to the time taken to write all of the one or more data structures written to since performing the checkpoint operation.

Preferably, writing the contents of the one or more data structures to the non-volatile memory includes writing the contents with a low priority of operation to an alternate checkpoint location.

The present invention will be more fully understood from the following detailed description of the preferred embodiments thereof, taken together with the drawings, in which:

DETAILED DESCRIPTION OF PREFERRED EMBODIMENTS

Figure 1:
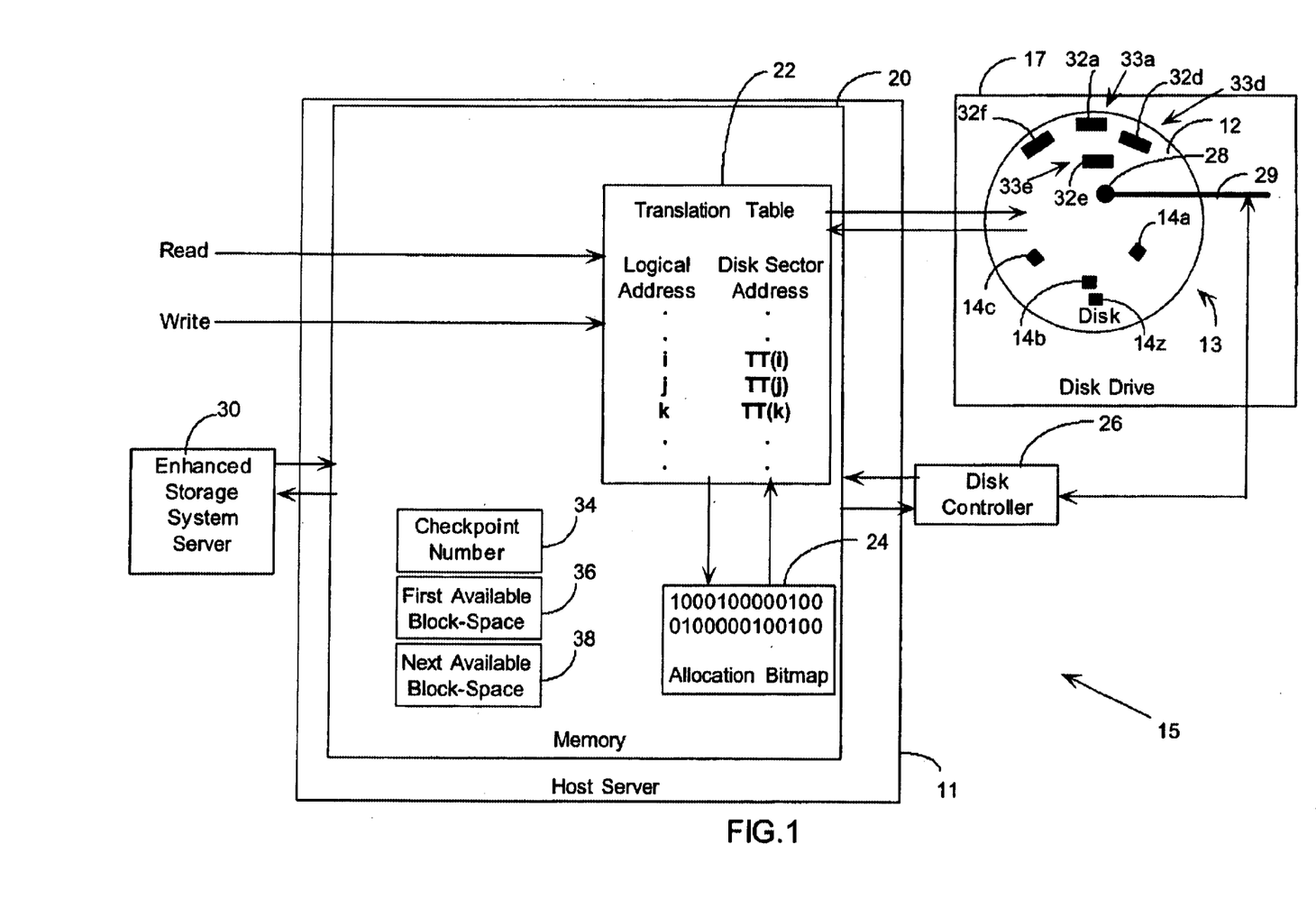
FIG. 1 is a schematic block diagram of an enhanced storage system, according to a preferred embodiment of the present invention.

Reference is now made to FIG. 1, which is a schematic block diagram of an enhanced storage system (ESS) 15, according to a preferred embodiment of the present invention. ESS 15 comprises a non-volatile storage disk 12 operative in a disk drive 17, and managed by a host server 11. Disk 12 is preferably implemented in a magnetic medium 13, which is written to and read from by a disk head 28 on a disk arm 29. The operation of head 28 and arm 29 is controlled by a disk controller 26. Disk controller 26, disk drive 17, host server 11 and all components thereof are preferably off-the-shelf, industry-standard items. Magnetic medium 13 is partitioned into a plurality of physical sectors 14a, 14b, 14c, . . . 14z, hereinafter referred to collectively as sectors 14, by methods known in the art. Each physical sector is referenced by a physical sector address. Most preferably, each sector has a size equal to an integral power of 2 bytes, for example 512 bytes.

Most preferably, data to be stored on disk 12 are written in units having a size equal to the size of a fixed integral number of sectors 14. Such a unit of data is hereinafter referred to as a block. Each block 33a, 33b, 33c, . . . , hereinafter referred to collectively as blocks 33, is referenced by a unique logical address. Blocks 33 are most preferably stored on disk 12 into a plurality of fixed-sized block-spaces 32a, 32b, 32c, . . . , hereinafter referred to collectively as block-spaces 32. Each block-space 32 most preferably comprises consecutive sectors 14 equal in number to the number of sectors in block 33. Each block 33, and therefore each block-space 32, has a size preferably equal to 4–16 Kbytes, depending on the size and number of sectors 14 comprising each block-space 32. Alternatively, any other standard-size block-space may be defined when disk 12 is formatted.

During formatting of disk 12, some of sectors 14 are reserved for describing physical and logical parameters relating to ESS 15 and disk 12. The parameters include the size of each sector 14, the number of sectors in disk 12, the size and number of block-spaces 32, and a range of logical addresses supported by disk 12. Also reserved during formatting of disk 12 is space used during a checkpoint operation, when, inter alia, data stored in a volatile memory 20 comprised in host server 11 are stored to disk 12. The checkpoint operation is described in more detail below.

Most preferably, space not reserved in this manner is allocated to a plurality of block-spaces 32. Alternatively, all space on disk 12, including reserved space as described hereinabove, is allocated to the plurality of block-spaces 32, and the reserved space is marked as occupied in an allocation bitmap data structure 24, which is described in more detail below, thus giving more flexibility in changing space allocated on the disk.

Volatile memory 20 stores a number of dynamic data structures described in detail hereinbelow. The content of the data structures is preferably controlled by disk controller 26. Alternatively, the content of the data structures is controlled by an ESS server 30.

Memory 20 stores a translation table data structure 22 that binds each logical block address "i" to a disk sector, herein termed TT(i), of disk 12. TT(i) is most preferably the first sector of the block-space that accommodates the most recently stored contents of the block whose logical address is i. Initially, all values of TT(i) are set to a NULL value. As ESS 15 writes data to disk 12, values of TT(i) for specific logical block addresses i are changed from their NULL value, and are updated to become the disk sector address of the block-space where the block was last stored.

Memory 20 also stores allocation bitmap data structure 24, which is used to locate available disk block-spaces 32 during each store of a block to disk 12. For each block-space i, allocation bitmap 24 sets a corresponding bit to be 0 if the block-space is available for storage of block contents. The corresponding bit is set to 1 if the block-space comprises the contents of a block, or if the block-space has been reserved for use by ESS 15 data structures. When disk 12 is initialized, all block-spaces except for those reserved for ESS 15 are available so that each bit in allocation bitmap 24 is set to 0.

As described in more detail below, in operation of ESS 15, disk arm 29 stores blocks to disk 12 in a "move-forward-and-store" motion. Memory 20 stores a checkpoint-number 34, which is a counter of a number of times disk arm 29 has completed a move-forward-and-store pass over the disk. Thus, checkpoint-number 34 updates each time arm 29 completes a move-forward-and-store motion and is about to go all the way back and start another motion. Initially, checkpoint-number 34 is set to 0. Memory 20 also stores two pointers, a first-available-block-space pointer 36, and a next-available-block-space pointer 38. First-available-block-space pointer 36 points to the block-space that was first stored to in a current move-forward-and-store pass. Pointer 36 is stored to disk 12 each time a checkpoint operation is performed, and is used to point to the block-space to start from when a disk recovery is performed. Next-available-block-space pointer 38 is used when a data storage operation is performed to disk 12, and points to the available block-space that will be stored to in the next storage operation. Thus, each block stored incorporates data pointing to the next block-space stored to, so that the blocks are connected by a "chain" of pointers 38. When a disk recovery is performed, the addresses of blocks after the block pointed to by first-available-block-space pointer 36 are recovered by ESS 15 following the chain. Initially, both pointers 36 and 38 are set to the address of the first available block-space.

When a block-space is required for data storage, one block-space is allocated from the free block-spaces available on disk 12, according to allocation bitmap 24. To maintain the move-forward-and-store motion, and to optimize the choice of which block-space is to be stored to next, ESS 15 records a physical sector address of the next-available-block-space, and looks for a new available block-space from that address forward.

Figure 2:
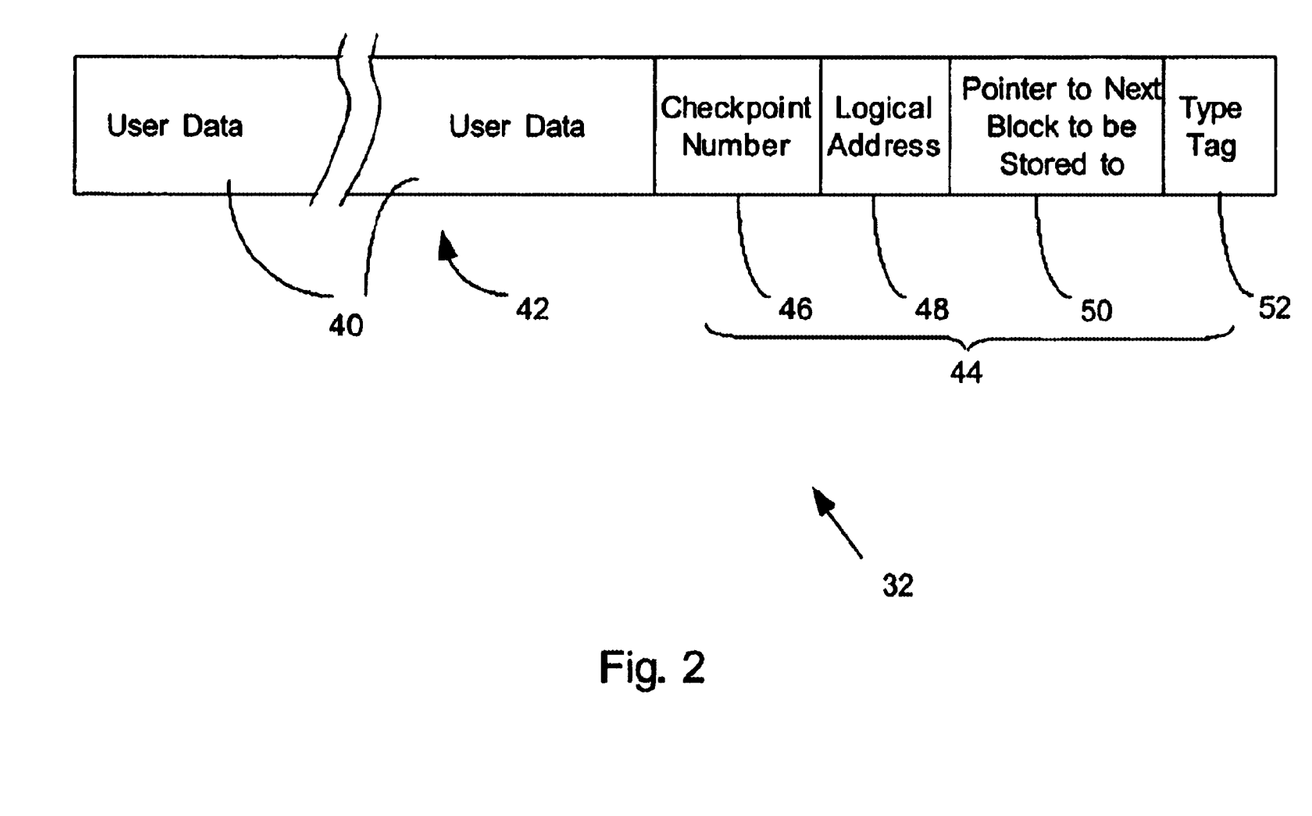
FIG. 2 is a diagram showing data structures that are stored together with user data when a data block is stored on a disk of the storage system of FIG. 1, according to a preferred embodiment of the present invention.

FIG. 2 is a diagram showing data structures that are stored together with data when each block-space 32 on disk 12 is stored to, according to a preferred embodiment of the present invention. In each block-space 32, user data 40, in most cases comprising data not used by ESS 15, i.e., data that are written to disk 12 from a user application or other outside operation, are stored in a region 42. Data that are used by ESS 15 are stored in a trailer region 44. Region 44 typically has a size of 20–30 bytes, i.e., the size of region 44 is less than 1% of the total block size. Data stored in region 44 comprise the following fields:

A checkpoint-number field 46, wherein is stored the current value of checkpoint-number 34 when the block is stored.

A logical-address field 48, comprising the logical address of the stored block.

A pointer-to-next-block-space-to-be-stored-to field 50, wherein is stored the current value of next-available-block-space 38 when the block is stored.

A type-tag field 52, comprising one bit for tagging special types of blocks. For example, "standard" blocks are tagged 0; a tag 1 is for a special block such as a delete block, described hereinbelow. When type-tag field 52 is set to 1 to delineate the block as special, region 42 and/or field 48 may be used to provide more information on the block.

Figure 3:
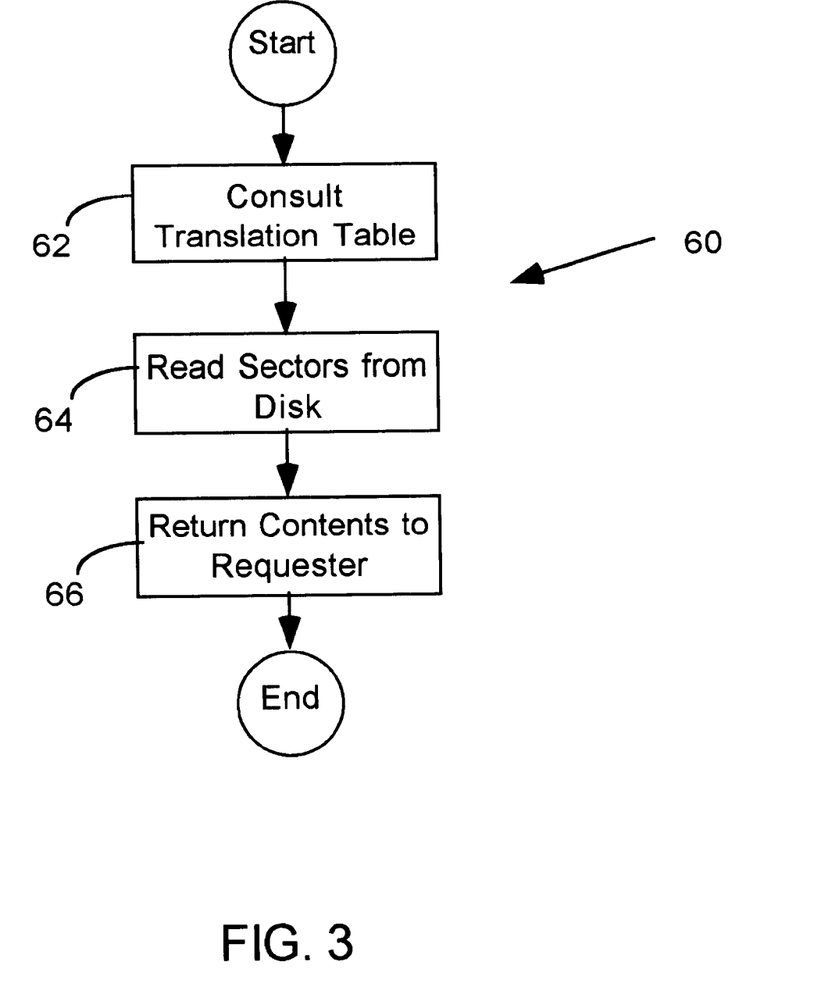
FIG. 3 is a flowchart illustrating a method for performing a read operation from a disk, according to a preferred embodiment of the present invention.

FIG. 3 is a flowchart illustrating how the data structures of memory 20 (FIG. 1) and those of specific blocks are used when a read operation 60 from disk 12 is performed, according to a preferred embodiment of the present invention. Read operation 60 is a request to read the contents of a block having logical address "i." In an initial step 62, translation table 22 is used to find the first disk sector address, TT(i), of the block-space wherein the contents of the block having logical address "i" are stored. In a read step 64, ESS 15 reads the contents of sector address TT(i) onward, according to the number of sectors in a block-space. In a final step 66, ESS 15 returns the contents of the sectors that have been read to the requester.

Figure 4:
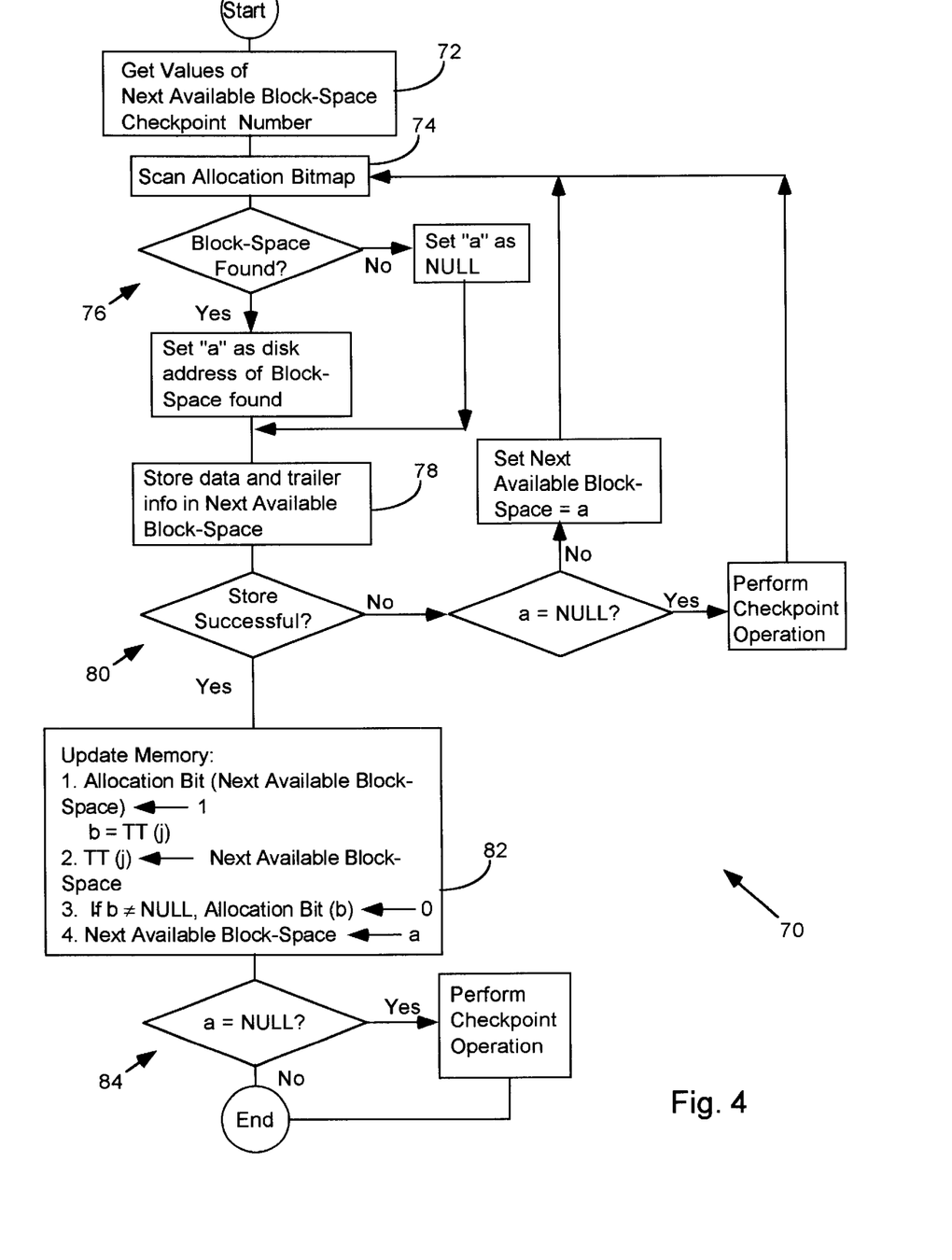
FIG. 4 is a flowchart illustrating a method for performing a write operation to a disk, according to a preferred embodiment of the present invention.

FIG. 4 is a flowchart illustrating how the data structures of memory 20 and those of specific blocks are used when a write operation 70 is performed to disk 12, according to a preferred embodiment of the present invention. Write operation 70 is to write data contents "CON1" to disk 12, and to associate CON1 with a logical address "j." It is assumed that logical address j is initially associated with a physical disk sector address "b," i.e., TT(j)=b.

In a first step 72, ESS 15 obtains the current values of next-available-block-space 38 and checkpoint-number 34 from memory 20. In a scan step 74, allocation bitmap 24 is scanned to find the first available block-space following next-available-block-space 38. In allocation steps 76, a variable "a" is assigned to the disk sector address of the block-space found. If no available block-space is located by the scan, "a" is set to be NULL.

In a store step 78, contents CON1 and a trailer are stored to next-available-block-space 38. The trailer comprises checkpoint-number 34, logical address i, variable a, and type tag 0, which are respectively stored to checkpoint-number field 46, logical address field 48, pointer-to-next-block-to-be-stored-to field 50, and type tag field 52.

In store-check steps 80, ESS 15 checks to see if store step 78 was successful. If store step 78 fails, for example if one of the sectors of disk 12 to which data are to be stored to is faulty, and a≠NULL, next-available-block-space 38 is set to a, and ESS 15 returns to scan step 74. If store step 78 fails and a=NULL, then ESS 15 performs a checkpoint operation which inter alia writes the contents of translation table 22 and allocation bitmap 24 to disk 12, and which is described in more detail below. ESS 15 then returns to scan step 74.

If store step 78 is successful then an update-memory step 82 is performed on data structures within memory 20 by ESS 15. Update-memory step 82 comprises the following assignments:

1. In allocation bitmap 24, the allocation bit for next-available-block-space 38, herein written as A(next-available-block-space 38) is assigned to be 1.

2. In translation table 22, TT(j) is assigned to next-available-block-space 38.

3. In allocation bitmap 24, A(b) is assigned to be 0, so that disk address b is "released" and becomes available for writing to in a future operation of ESS 15.

4. In memory 20 next-available-block-space 38 is assigned the value a.

In a final series of check-steps 84, the value of a is checked. If a=NULL, then a checkpoint operation is performed and write operation 70 ends. If a≠NULL, write operation 70 ends.

It will be appreciated that each successful write operation 70 stores data in a block-space having a disk address higher than the previous write operation. Thus, disk arm 29 moves forward for these write operations, so that the overall speed of writing to disk 12 is maximized (as is the case for log-structured file systems). By storing trailer information in store step 78 for each block written, updates to translation table 22 and allocation bitmap 24 are stored to disk 12 without any extra input/output cost, so that the table and the bitmap may be recovered in the event of a failure such as a power failure. When disk arm 29 can no longer move forward, i.e., when a=NULL, then a checkpoint operation is performed.

Figure 5:
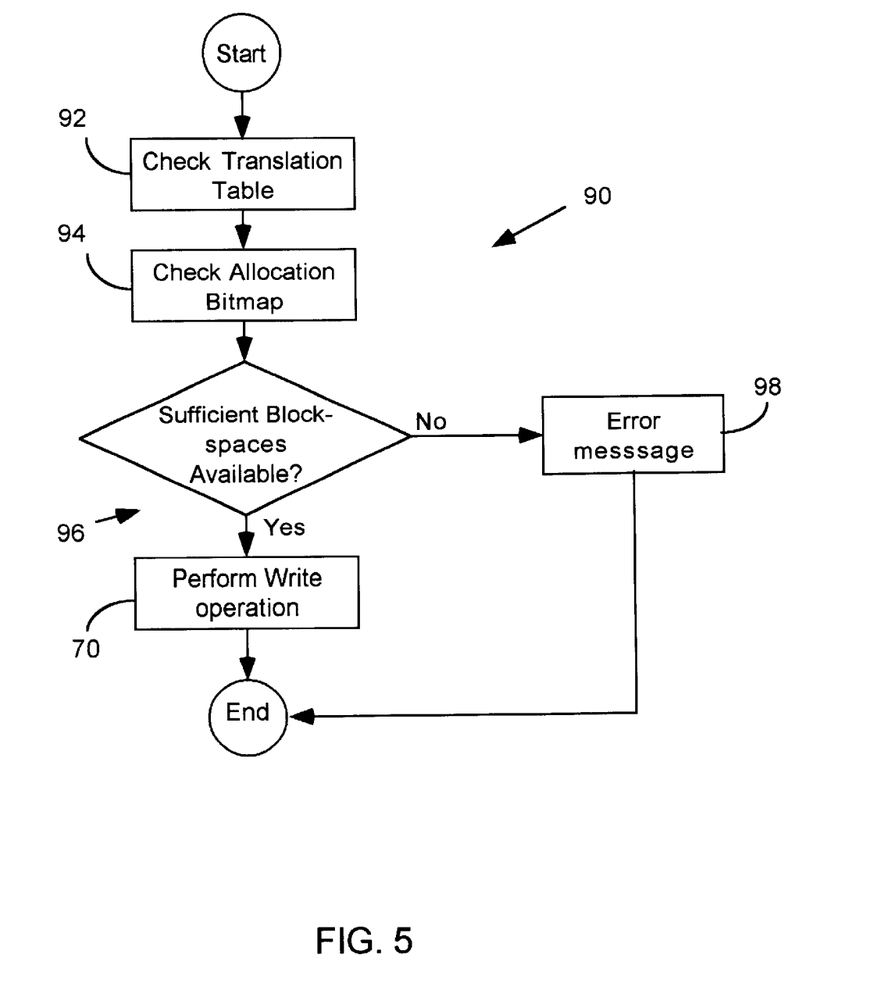
FIG. 5 is a flowchart illustrating a method for performing an allocate-and-write operation to a disk, according to a preferred embodiment of the present invention.

FIG. 5 is a flowchart illustrating how the data structures of memory 20 and those of specific blocks are used when an allocate-and-write operation 90 is performed to disk 12, according to a preferred embodiment of the present invention. Operation 90 is to store data contents "CON2" to a free block-space, and allocate and bind a logical address to the block-space used. In a first step 92 ESS 15 opens translation table 22 and looks for a logical address k wherein TT(k)= NULL, i.e., logical address k does not have an associated block-space. Logical address k will be the allocated address for CON2. In check steps 94 and 96, ESS 15 checks in allocation bitmap 24 that there are sufficient block-spaces available in disk 12, so that after allocate-and-write operation 90 has concluded, at least one block-space is available, i.e., ESS 15 checks that there are at least two block-spaces available, including the block-space that has been checked as free. (Thus, in the event of a subsequent write operation 70, as described hereinabove, or of a subsequent delete operation 100, described hereinbelow, there is always one block-space available.) If there are insufficient block-spaces available, operation 90 returns an error message 98 and operation 90 concludes. If sufficient block-spaces are available, operation 90 continues substantially as described above for write operation 70 (FIG. 4) except for the following differences: CON2 and k replace CON1 and j respectively, and in step 82, assignment 3 is not performed since b=NULL.

It will be understood that allocate-and-write operation 90 allows a plurality of users to allocate their block requests independently since the users can allocate the blocks without needing to synchronize their requests, and without needing to protect against collisions. Furthermore, operation 90 withstands failures, such as a cache failure during the course of the operation, as described above with reference to write operation 70.

Figure 6:
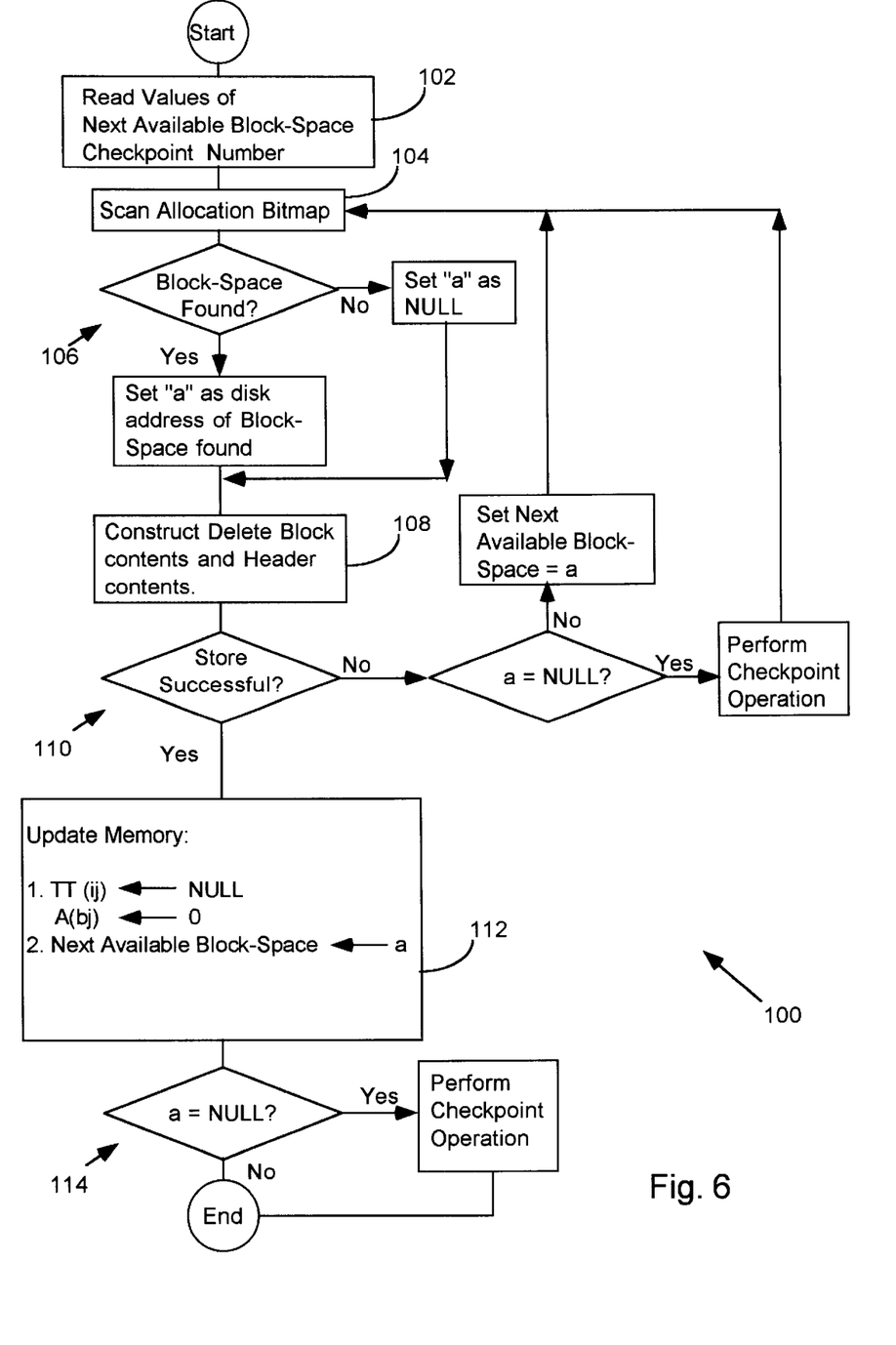
FIG. 6 is a flowchart illustrating a method for performing a delete-blocks operation, according to a preferred embodiment of the present invention.

FIG. 6 is a flowchart illustrating how the data structures of volatile memory 20 and those of specific blocks are used when a delete-block operation 100 is performed, according to a preferred embodiment of the present invention. Delete-block operation 100 generates on disk 12 a delete block 33$d$, whose data field comprises a list of logical addresses ($i_1$, $i_2$, $i_3$, ... ) of blocks that are to be deleted. Delete block 33$d$ is most preferably stored on disk 12 until a checkpoint operation is performed, after which operation the block-space wherein delete block 33$d$ is stored becomes available for storage of other data. Operation 100 deletes the binding of blocks which have some stored contents, so that the stored contents of the deleted blocks on disk 12 may be overwritten.

In a first step 102, ESS 15 reads the current values of next-available-block-space 38 and checkpoint-number 34 from memory 20. In a scan step 104, allocation bitmap 24 is scanned to find the first available block-space following next-available-block-space 38. In allocation steps 106, a variable "a" is assigned to the disk sector address of the block-space found. If no available block-space is located by the scan, a is set to be NULL.

In a store step 108, the contents of delete block 33$d$ are constructed. List ($i_1$, $i_2$, $i_3$, ... ), corresponding to the list of blocks to be deleted, is stored in region 42. Trailer 44 is also constructed. Trailer 44 comprises checkpoint-number 34, variable a, and type tag 1, which are respectively stored to checkpoint-number field 46, pointer to next block-space to be stored to field 50, and type tag field 52. No value is written to logical address field 48 of trailer 44, since the delete block being written in this operation 100 is only temporary. The contents, comprising user data 40 and trailer 44, are stored in the block-space having the address given by next-available-block-space 38.

In store-check steps 110, ESS 15 checks to see if store step 108 was successful. If store step 108 fails due to a faulty sector of disk 12 to which data are to be stored to, and a≠NULL, next-available-block-space 38 is set to a, and ESS 15 returns to scan step 104. If store step 108 fails and a=NULL, then ESS 15 performs a checkpoint operation and then returns to scan step 104.

If store step 108 is successful, then an update-memory step 112 is performed on translation table 22 and allocation bitmap 24 by ESS 15. For each logical block $i_j$ deleted, assume $b_j$ is the disk sector address wherein $i_j$ is stored. I.e., TT($i_j$)=$b_j$ for all j. Update-memory step 112 comprises the following assignments:

1. For each j, in translation table 22 TT($i_j$) is assigned the value NULL, and in allocation bitmap 24, A($b_j$) is assigned the value 0.

2. In memory 20 next-available-block-space 38 is assigned the value a.

In a final series of check-steps 114, the value of a is checked. If a=NULL, then a checkpoint operation is performed and delete-block operation 100 ends. If a≠NULL, delete-block operation 100 ends.

In delete-block operation 100, delete block 33$d$ is stored in the block-space having the disk sector address corresponding to the initial value of next-available-block-space. Assume this address is p. Operation 100 does not assign A(p) to be 1 in allocation bitmap 24, i.e., block-space p remains marked as available. However, since at the end of operation 100 next-available-block-space 38 is assigned the value a, and since a>p, block-space p will not be stored to, until a checkpoint operation is performed, because ESS 15 always looks forward for block-spaces. After a checkpoint operation has been performed, block-space p may be stored to in subsequent operations of ESS 15.

Figure 7:
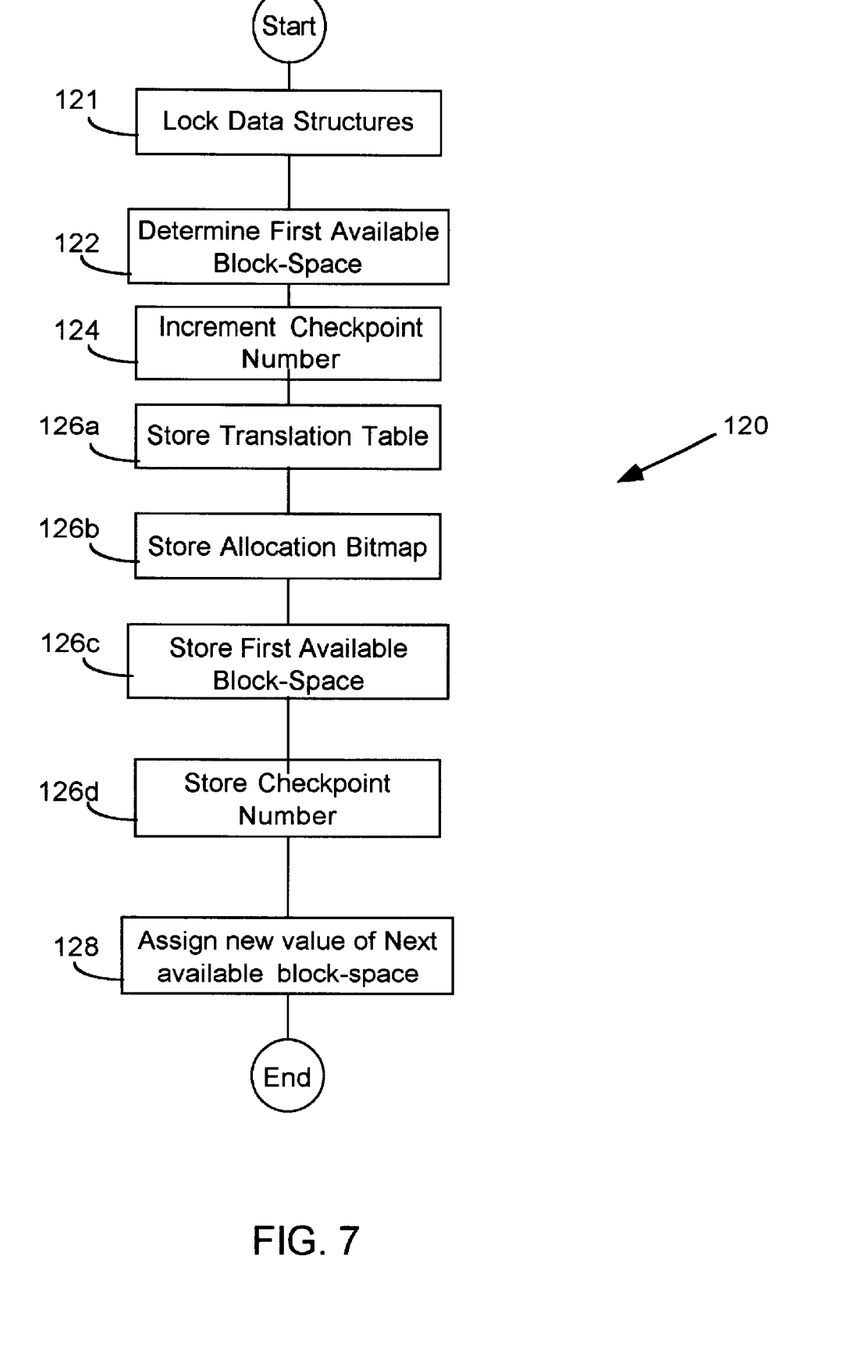
FIG. 7 is a flowchart representing steps in a checkpoint operation, according to a preferred embodiment of the present invention.

FIG. 7 is a flowchart representing steps in a checkpoint operation 120, according to a preferred embodiment of the present invention. Checkpoint operation 120 copies structures from memory 20 to disk 12 at periodic intervals, so that in the event of a failure, ESS 15 can recover quickly. Checkpoint operation 120 may be performed by ESS 15 at any time, and must be performed when no block-space is available beyond next-available-block-space 38.

In a first step 121, checkpoint operation 120 locks all data structures in memory 20, so that ESS 15 ceases to provide operations other than the checkpoint operation. In a second step 122, checkpoint operation 120 determines the value of first-available-block-space 36. Block-space 36 is the block-space, as determined from allocation bitmap 24, which is free and which is associated with the lowest disk sector address. In an increment step 124, the value of checkpoint-number 34 is incremented, and the incremented value is read.

In store steps 126$a$, 126$b$, 126$c$, and 126$d$, operation 120 writes translation table 22, allocation bitmap 24, firstavailable-block-space 36, and incremented checkpoint-number 34 to a preallocated checkpoint-store block-space 32e on disk 12. Block-space 32e is one of a plurality of block-spaces allocated for the storage of checkpoints when disk 12 is formatted. Preferably, checkpoint data is written to disk 12 in an alternating manner, so that previous checkpoint data is not immediately written over or erased. In a reassignment step 128, the value of next-available-block-space 38 is assigned to be the value of first-available-block-space 36, as found in second step 122, which next-available-block-space is used for a subsequent move-forward-and-store operation such as write operation 70 or allocate-and-write operation 90.

Typically step 126a, wherein translation table 22 is stored, and step 126b, wherein allocation bitmap 24 is stored, require the most time of steps 121, 122, 124, 126a–126d, and 128. Most preferably, to reduce the time taken by step 126a and step 126b, table 22 and bitmap 24 are partitioned into segments equal in size to a disk sector. Each time table 22 or bitmap 24 is updated during the operation of ESS 15, the relevant segment is marked. During steps 126a and 126b of checkpoint operation 120, only updated segments are stored to disk 12, one segment to each disk sector. If checkpoint operation 120 occurs frequently due to a small number of available block-spaces in disk 12, there are relatively few segments that need to be stored to the disk, and the operation is relatively short. Alternatively, if there are a relatively large number of available block-spaces in disk 12, checkpoint operation 120 occurs infrequently, so that the overall time spent on operation 120 is small compared to a non-checkpoint operation.

Figure 8:
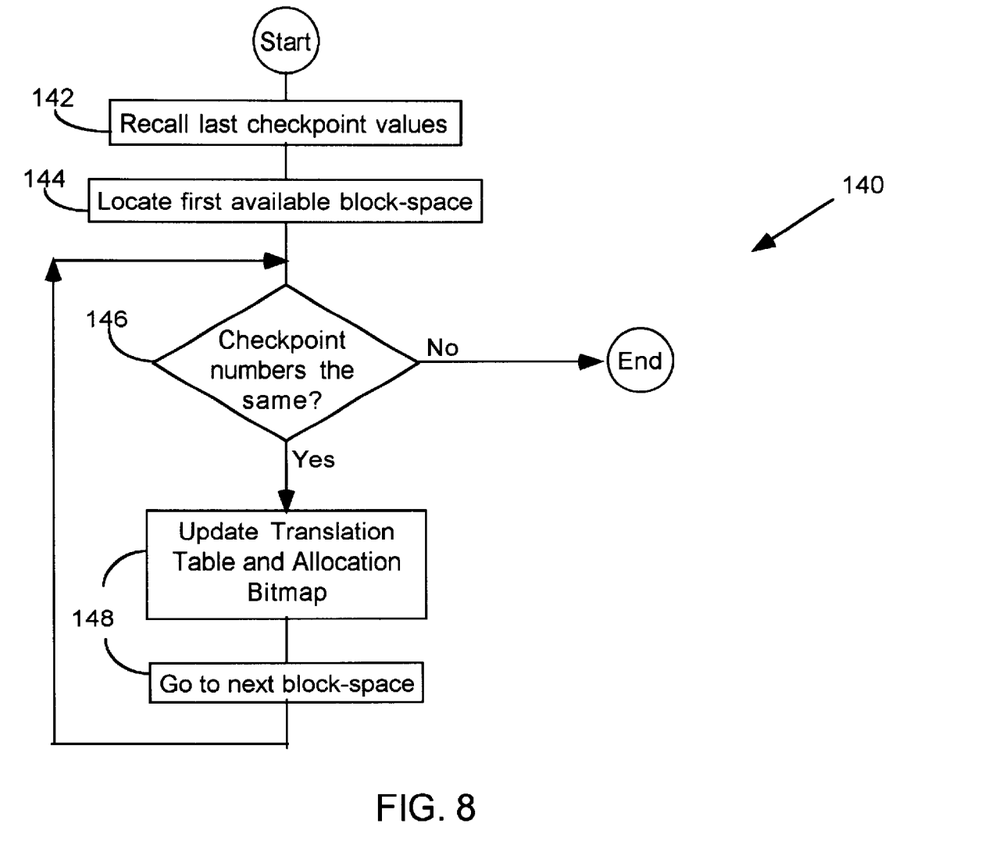
FIG. 8 is a flowchart showing steps performed during a memory reconstruction operation, according to a preferred embodiment of the present invention.

FIG. 8 is a flowchart showing steps performed during a memory reconstruction operation 140, according to a preferred embodiment of the present invention. Operation 140 is most preferably performed after a power and/or a cache failure have occurred, and serves to reconstruct all the values of the data structures in memory 20. In a recall step 142, values of translation table 22, allocation bitmap 24, first-available-block-space 36, and checkpoint-number 34 are copied from checkpoint-store block-space 32e back into memory 20. As described with reference to FIG. 7, block-space 32e comprises the latest values of memory 20 data structures, apart from the values changed since block-space 32e was written to. These latter values may be reconstructed from the blocks stored to disk 12 since block-space 32e was written, as described hereinbelow.

In a first locate step 144, operation 140 uses the value of first-available-block-space 36 to locate the first block stored since checkpoint-store block-space 32e was written to, i.e., since the last checkpoint operation 120 was performed. Starting from block-space 36, in a first reconstruction step 146 operation 140 reads the block from block-space 36 and checks its checkpoint-number 46, comparing it with checkpoint-number 34. If the numbers are the same, in reconstruction steps 148 operation 140 re-executes the updates to data structures translation table 22, allocation bitmap 24, and next-available-block-space 38, which updates occurred before the failure, when the block just read was stored. It will be understood from the descriptions of write operation 70, allocate-and-write operation 90, and delete-block operation 100, that updates to these data structures can be uniquely determined from fields type-tag 52, logical-address 48, and the sector address of the block-space from which the block was read. Then, at the end of step 148, operation 140 advances to the next block-space, the one pointed to by field pointer-to-next-block-to-be-stored-to 50 of the block read. The process of reading blocks using steps 146 and 148 continues until step 146 returns a negative answer, when checkpoint-number 46 and checkpoint-number 34 are not the same, at which point operation 140 terminates.

It will be appreciated that reconstruction operation 140 enables complete reconstruction of translation table 22 and allocation bitmap 24 after any failure of ESS 15 has occurred. It will be further appreciated that operation 140 is implemented by sequentially increasing the disk sector address that disk arm 29 moves to, so that the disk arm only moves forward and so that time spent in reconstruction operation 140 is minimized. The time spent in reconstruction is substantially equal to the time spent in initially writing the blocks being used in the reconstruction, i.e., those blocks written to since the last checkpoint operation. Furthermore, reconstruction operation 140 enables complete tracking of substantially all blocks used since the last checkpoint operation, so that there is substantially no leakage of blocks during operation of ESS 15.

Since operation 140 does not write to disk 12, if a failure occurs during the operation, then operation 140 can resume from step 142 once the failure has been rectified. It should also be noted that if any of the blocks in operation 140 can not be read, for example due to a faulty sector error, a succeeding block can be located by a sequential forward scan of disk 12, from the faulty sector on, until a block-space is found wherein checkpoint-number 46 and checkpoint-number 34 are the same, or the end of disk 12 is reached. Thus, at most only the block corresponding to the faulty sector is lost, and not a whole sequence of blocks.

Figure 9:
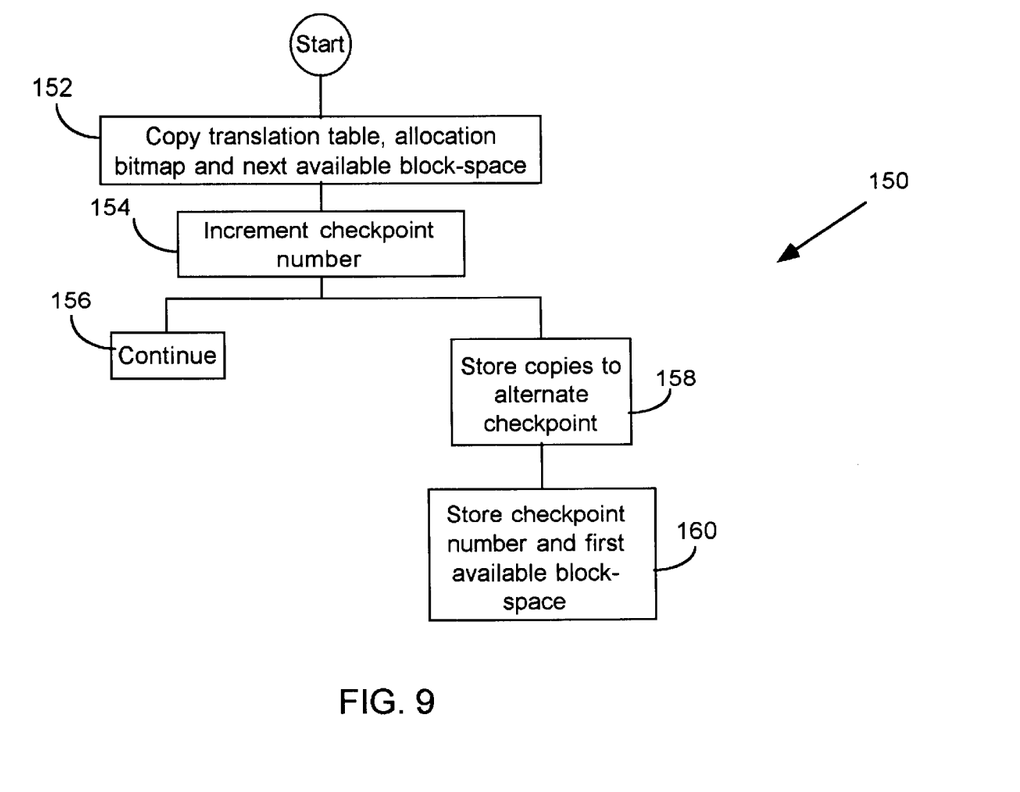
FIG. 9 is a flowchart showing steps performed during an alternative checkpoint operation, according to a preferred embodiment of the present invention.

FIG. 9 is a flowchart showing steps performed during an alternative checkpoint operation 150, according to a preferred embodiment of the present invention. Checkpoint operation 150 is performed in small time increments, and effectively as a background operation, so that the effect on a user of ESS 15 is reduced. In a first step 152, when checkpoint operation 150 initiates, copies of translation table 22, allocation bitmap 24, and next-available-block-space 38 are made within memory 20. In an increment step 154, checkpoint-number 34 is incremented, and the incremented value is copied and saved within memory 20. In an operation step 156 ESS 15 then continues to operate using the original values of translation table 22, allocation bitmap 24, and checkpoint-number 34, by continuing to write blocks to disk 12 for write, allocate-and-write, and delete operations as described hereinabove. Operation step 156 continues until a block-space with an address at or beyond first-available-block-space 36 is required to be written to, or until operation 150 completes.

While ESS 15 continues as described above in operation step 156, checkpoint operation 150 moves to a first-store step 158. In step 158, ESS 15 stores, most preferably using a thread with a low priority so that user operations are not affected, the copies made in first step 152. The copies are preferably stored segment by segment to an alternate dedicated checkpoint block-space 32f on disk 12. Since store step 158 is performed on copies of data structures used by ESS 15, the normal operation of the system is not affected by store step 158. When all data structures have been stored to disk 12, in a second-store step 160 operation 150 stores the incremented checkpoint-number. Step 160 also generates and stores a new first-available-block-space 36 by assigning block-space 36 the value of next-available-block-space 38 (from first step 152).

Once step 160 has completed, recovery is possible, as described hereinabove for reconstruction operation 140

(FIG. 8), using checkpoint data stored in block-space 32f. Alternatively, if a failure occurs before step 160 has completed, reconstruction operation 140 is able to utilize data from previously stored block 33e, and data written to block-spaces during operation 156, to completely recover from the failure.

Referring back to FIG. 1, it will be appreciated that ESS 15 enables disk 12 to be moved from host server 11 to a second host, with substantially no loss of stored data. Once installed in the second host, ESS 15 is able to regenerate up-to-date data structures in memory 20 of the second host, using restoration operation 140, as described hereinabove. Thus, in the case of host server 11 failing, ESS 15 enables data to be recovered easily.

In some preferred embodiments of the present invention, field pointer-to-next-block-to-be-stored-to 50 (FIG. 2) is not utilized. It will be understood that values in field 50 are only used at recovery for reading blocks stored since the last checkpoint. As an alternative to field 50, ESS 15 selects a block-space for storage to according to a predetermined block-space selection policy. For example, given a disk sector address p of a last block-space stored to, a next block-space to be stored to has disk sector address q wherein q>p and the difference q−p is as small as possible. Other policies will be apparent to those skilled in the art. In a reconstruction operation using this selection policy, a recovery operation starts from a block-space p whose address is stored at first-block-space 36. The recovery operation reconstructs allocation bitmap 24 for ESS 15. The reconstructed bitmap and the predetermined policy are used to sequentially locate block-spaces written to since block-space p was written, updating the appropriate allocation bitmap as blocks in the located block-spaces are read from.

In the event that a faulty sector is encountered when a block-space is located, so that the block occupying the block-space cannot be read from, then it is not possible to continue to reconstruct the allocation bitmap. In a preferred embodiment of the present invention, this difficulty is circumvented by, for example, maintaining a special list of block-spaces written to, which list is referred to on a second pass of the reconstruction.

In some preferred embodiments of the present invention, disk 12 (FIG. 1) is divided into two parts. A first part of disk 12 formatted as described hereinabove with reference to FIG. 1, and the first part of disk 12 is managed using the data structures of memory 20, as described hereinabove for ESS 15. A second part of disk 12 is formatted and managed using a conventional method. If an operation to disk 12 involves an address in the first part of disk 12, ESS 15 is used for the operation. If an operation to disk 12 involves an address in the second part of disk 12, the conventional method is used for the operation.

As is known in the art, certain software applications optimize their performance by operating with block sizes which are powers of 2. For example, a specific application may operate optimally with a block size of 512 bytes. In order for applications such as these to operate efficiently, disk 12 (FIG. 1) may be divided into two parts wherein a first part is operated using ESS 15 and a second part is operated using a conventional method, as described hereinabove. Applications needing to use block sizes having powers of 2 are assigned to use the second part of disk 12. Alternatively, when disk 12 is formatted, it may be formatted to have sectors which are larger than a specific power of 2.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Apparatus for electronic data storage, comprising:
a non-volatile memory, adapted to receive a succession of data blocks including a first data block and a second data block, subsequent to the first data block in the succession, for storage at respective locations therein;
a controller, which is configured to convey the succession of data blocks to the non-volatile memory while writing to the non-volatile memory, together with the first data block, a pointer value to the location of the second data block; and
a volatile memory which stores one or more data structures containing data indicative of one or more properties of at least some of the data blocks, at least some of which data are written by the controller to the non-volatile memory, so that the contents of the volatile memory can be regenerated from the at least some of the data in the one or more data structures that are stored in the non-volatile memory.

2. Apparatus according to claim 1, wherein one of the data structures comprises a translation tale which maps logical addresses of the succession of data blocks to respective physical addresses.

3. Apparatus according to claim 2, wherein the controller writes the respective logical addresses to the succession of data blocks.

4. Apparatus according to claim 1, wherein one of the data structures comprises an allocation bitmap which is indicative of an availability of the respective locations.

5. Apparatus according to claim 1, wherein one of the data structures comprises the pointer value to the location of the second data block.

6. Apparatus according to claim 1, wherein one of the data structures comprises a pointer value to a first location in the succession.

7. Apparatus according to claim 1, wherein the non-volatile memory comprises a disk having a disk head, and wherein the controller writes the data blocks to the disk in a series of passes of the disk head over a surface of the disk in a single direction.

8. Apparatus for electronic data storage, comprising:
a non-volatile memory, adapted to receive a succession of data blocks for storage at respective locations therein;
a controller, which is configured to convey the succession of data blocks to the non-volatile memory while writing to the non-volatile memory, together with at least some of the data blocks, a pointer value to the location of a subsequent data block in the succession; and
a volatile memory which stores one or more data structures containing data indicative of one or more properties of at least some of the data blocks, at least some of which data are written by the controller to the non-volatile memory, so that the contents of the volatile memory can be regenerated from the at least some of the data in the one or more data structures that are stored in the non-volatile memory, wherein the non-volatile memory comprises a disk having a disk head, and wherein the controller writes the data blocks to the disk in a series of passes of the disk head over a surface of the disk in a single direction, wherein each of the series of passes has a checkpoint-number, and wherein one of the data structures comprises a value indicative of the checkpoint-number of a current pass of the series of passes of the disk head.

9. Apparatus for electronic data storage, comprising:

a non-volatile memory, adapted to receive a succession of data blocks for storage at respective locations therein;

a controller, which is configured to convey the succession of data blocks to the non-volatile memory while writing to the non-volatile memory, together with at least some of the data blocks, a pointer value to the location of a subsequent data block in the succession; and a volatile memory which stores one or more data structures containing data indicative of one or more properties of at least some of the data blocks, at least some of which data are written by the controller to the non-volatile memory, so that the contents of the volatile memory can be regenerated from the at least some of the data in the one or more data structures that are stored in the non-volatile memory, wherein the non-volatile memory comprises a disk having a disk head, and wherein the controller writes the data blocks to the disk in a series of passes of the disk head over a surface of the disk in a single direction, wherein the controller writes the at least some of the data in the one or more data structures to the non-volatile memory at the conclusion of one or more of the passes of the disk head.

10. Apparatus for electronic data storage, comprising:

a non-volatile memory, adapted to receive a succession of data blocks including a first data block and a second data block, subsequent to the first data block in the succession, for storage at respective locations therein; and a controller, which is configured to convey the succession of data blocks to the non-volatile memory while writing to the non-volatile memory, together with the first data block, a pointer value to the location of the second data block, wherein the controller writes a type tag indicative of a use of each of the data blocks to each respective data block.

11. Apparatus for electronic data storage, comprising:

a non-volatile memory, adapted to receive a succession of data blocks including a first data block and a second data block, subsequent to the first data block in the succession, for storage at respective locations therein;

a controller, which is configured to convey the succession of data blocks to the non-volatile memory while writing to the non-volatile memory, together with the first data block, a pointer value to the location of the second data block; and a host server which manages the non-volatile memory, wherein the host server is able to recover contents of a volatile memory from data written by the controller to the non-volatile memory.

12. Apparatus for electronic data storage, comprising:

a non-volatile memory, adapted to receive a succession of data blocks including a first data block and a second data block, subsequent to the first data block in the succession, for storage at respective locations therein; and a controller, which is configured to convey the succession of data blocks to the non-volatile memory while writing to the non-volatile memory, together with the first data block, a pointer value to the location of the second data block, wherein the non-volatile memory comprises a portion to which the controller does not write the succession of data blocks with the pointer value.

13. A method for electronic data storage, comprising:

providing a succession of data blocks for storage at respective locations in a non-volatile memory, the succession including a first data block and a second data block, subsequent to the first data block in the succession;

determining for at least the first data block a pointer value to a location to which the second data block is to be written to in a subsequent storage operation; and storing the pointer value with the first data block in the non-volatile memory;

and comprising storing in a volatile memory one or more data structures containing data indicative of one or more properties of at least some of the data blocks, and writing at least some of the data that are in the data structures to the non-volatile memory, so that the contents of the volatile memory can be regenerated from the at least some of the data in the one or more data structures that are stored in the non-volatile memory.

14. A method according to claim 13, wherein storing the one or more data structures comprises storing a translation table which maps logical addresses of the succession of data blocks to respective physical addresses.

15. A method according to claim 14, and comprising using the translation table to locate a specific data block, so as to read data from the specific data block.

16. A method according to claim 13, wherein storing the one or more data structures comprises storing an allocation bitmap which is indicative of an availability of each of the respective locations.

17. A method according to claim 13, wherein writing the at least some of the data to the non-volatile memory comprises writing data to one of the succession of data blocks using the steps of:

scanning the one or more data structures to determine an available location in the non-volatile memory;

writing the data and at least some contents of the one or more data structures into the available location; and updating the one or more data structures responsive to the determined available location.

18. A method according to claim 17, wherein scanning the one or more data structures comprises allocating a logical address to the available location.

19. A method according to claim 17, wherein writing data to one of the succession of data blocks comprises writing a list of logical addresses of data blocks that are to be deleted.

20. A method for electronic data storage, comprising:

providing a succession of data blocks for storage at respective locations in a non-volatile memory;

determining for each of at least some of the data blocks in the succession a pointer value to a data block to be written to in a subsequent storage operation;

storing the succession of the data blocks and the pointer values in the non-volatile memory; and storing in a volatile memory one or more data structures containing data indicative of one or more properties of at least some of the data blocks, and writing at least some of the data that are in the data structures to the non-volatile memory, so that the contents of the volatile memory can be regenerated from the at least some of the data in the one or more data structures that are stored in the non-volatile memory, and comprising performing a checkpoint operation comprising the steps of:

locking the one or more data structures;

writing the contents of the one or more data structures to a checkpoint location in the non-volatile memory; and altering at least some of the contents of the one or more data structures responsive to writing the contents to the non-volatile memory.

21. A method according to claim 20, and comprising preforming a memory reconstruction operation comprising the steps of:

reading the contents of the one or more data structures from the non-volatile memory; and updating the one or more data structures in the volatile memory responsive to the contents.

22. A method according to claim 21, wherein performing the memory reconstruction operation comprises reading the contents of the one or more data structures written to since performing the checkpoint operation.

23. A method according to claim 20, wherein writing the contents of the one or more data structures to the non-volatile memory comprises writing the contents with a low priority of operation to an alternate dedicated checkpoint block-space.

* * * * *